Patented Apr. 17, 1923.

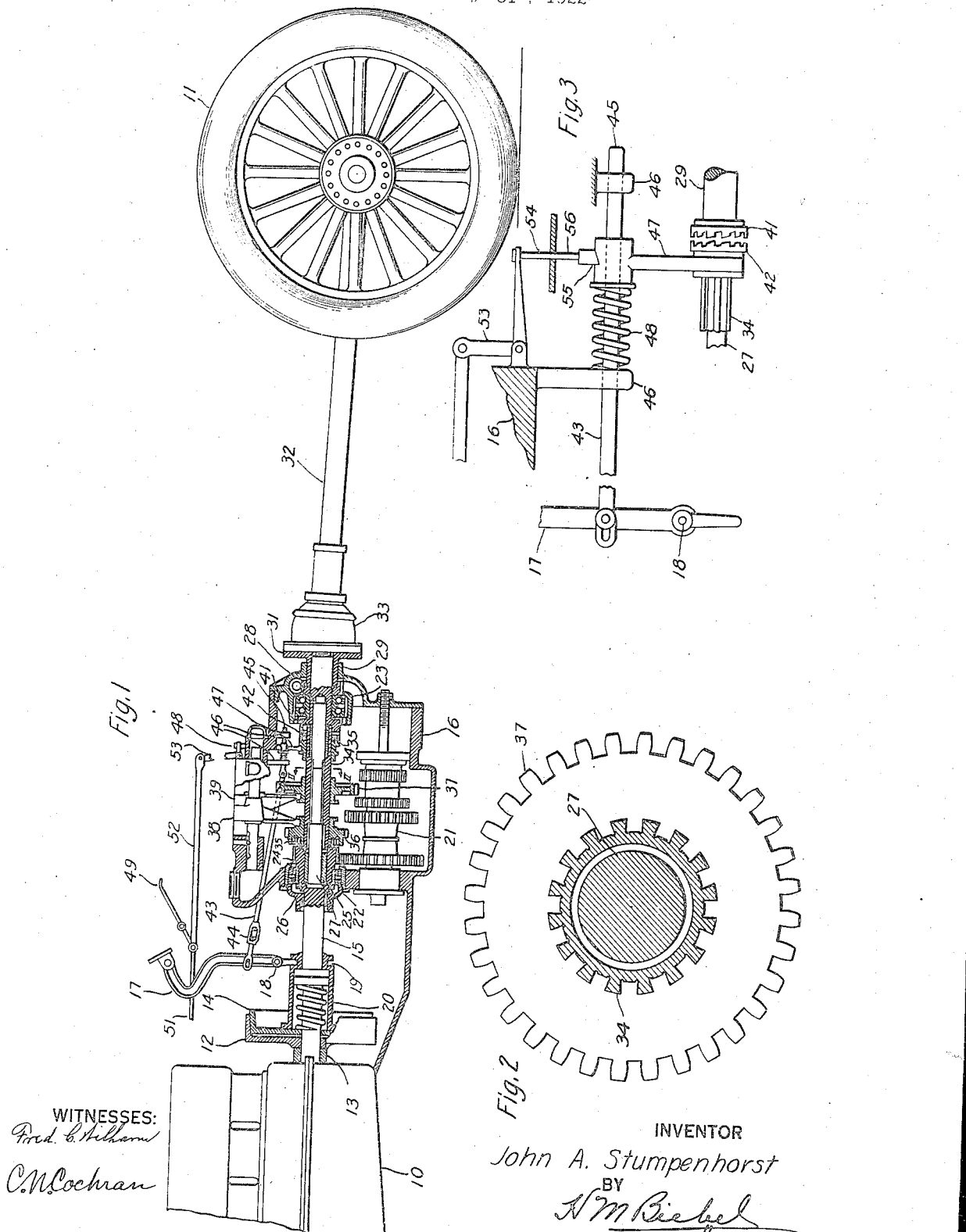

1,451,851

UNITED STATES PATENT OFFICE.

JOHN A. STUMPENHORST, OF WILKINSBURG, PENNSYLVANIA, ASSIGNOR TO DUPLEX TRANSMISSION COMPANY, A CORPORATION OF DELAWARE.

MOTOR-VEHICLE TRANSMISSION MECHANISM.

Application filed May 31, 1922. Serial No. 564,702.

*To all whom it may concern:*

Be it known that I, JOHN A. STUMPENHORST, a citizen of the United States, and a resident of Wilkinsburg, in the county of Allegheny and State of Pennsylvania, have invented a new and useful Improvement in Motor-Vehicle Transmission Mechanisms, of which the following is a specification.

My invention relates to motor vehicles, and particularly to power transmitting mechanisms for such vehicles, and it has for one of its objects to provide a relatively simple, compact, and easily assembled change-speed gear structure for permitting the disconnecting of the change-speed gears from both the driving motor and the driven member of such vehicles at the time the gears are changed.

Another object of my invention is to provide means interlocked with the motor controlling means to permit the reclosing of an auxiliary clutch installed between the change-speed gears and the driven member only under predetermined conditions of operation of the motor.

My invention is closely related to, and an improvement on, the invention disclosed and claimed in my Patent No. 1,396,074 issued November 8, 1921, to which patent reference will be hereinafter made. In developing the invention disclosed in the above numbered patent it was found desirable to incorporate certain details of construction in order to provide a unitary, compact, and rugged structure which would stand up under the operating conditions usually encountered in motor vehicles.

My invention embodies a change-speed gear casing having bearing members operatively supported thereby. A driving shaft extends into the casing rotatably supported by a bearing member and has its outer end operatively connected to one part of a main clutch, the other part of which is directly connected to the shaft of the driving engine or motor. A shaft structure comprises a short shaft located inside of the casing with its outer end rotatably mounted in the inner end of said driving shaft and its other end located in and secured to the inner end of a driven shaft rotatably supported by a second bearing. The outer end of the driven shaft may be operatively connected to the usual drive shaft of a motor vehicle. The inner end of the driven shaft is provided with a plurality of clutch-jaw projections, the longitudinal surfaces of which are beveled as disclosed in my hereinbefore mentioned patent. An exteriorly-splined hollow shaft, rotatably mounted on the short shaft, carries the usual change-speed gears which may be caused to selectively engage co-operating change-speed gears mounted on the usual counter shaft also located in the casing. I provide a second jaw-clutch member also located on the hollow shaft immediately adjacent to the co-operating jaw-clutch member which constitutes an integral part of the driven shaft. I provide the usual foot pedal lever for actuating the main clutch and for selectively actuating the jaw clutch member located on the splined hollow shaft. I provide also a means interlocked with the usual foot accelerator lever controlling the operation of the engine or motor, the means permitting the movable jaw-clutch member being disengaged from the stationary jaw-clutch member, but preventing the re-engagement thereof, except under pre-determined conditions of operation of the motor.

In the single sheet of drawings—

Figure 1 is a view, partly in side elevation and partly in section, of the driving mechanism of a motor vehicle in which is incorporated the device embodying my invention.

Fig. 2 is a view, in partial cross section thereof, taken on the line 11—11 thereof and, Fig. 3 is a view of a portion of the mechanism, in side elevation, and enlarged to show more clearly the details of construction.

Referring more particularly to Fig. 1 an engine 10 of any standard design operates to drive an automotive vehicle, here represented by a rear or driving wheel 11. One part 12 of a standard friction clutch is mounted on an extension 13 of the engine shaft and a co-operating clutch member 14 is mounted on a short shaft 15, one end of which extends into a casing 16 which contains a standard set of change-speed gears. The main clutch member 14 is actuated by a clutch pedal lever 17 that is pivotally mounted on a rock shaft 18 which is suitably supported on some part of the vehicle or on an extension of the casing 16. The lower end of the clutch pedal lever is forked and located in a circumferential groove 19 in an extension of the clutch member 14. A spring 20 normally presses the clutch member 14 against the clutch member 12 and is compressed by the action of the clutch pedal lever 17 when it is desired to dis-engage member 14 from member 12. While I have illustrated a specific design of clutch it is to be understood that a clutch of any suitable type may be employed.

A set of change-speed gears is mounted on a counter shaft 21 and a reverse gear and shaft (not shown) are also provided, both of these being of the usual standard design and construction. A front bearing member 22 and a rear bearing member 23 are located in opposite walls of the casing 16 and operatively supported thereby in any manner usually employed in the art. The inner end of the shaft 15 comprises portion 24 having longitudinally extending teeth, this being substantially the construction usually provided in such mechanisms. While I have shown this portion 24 as being integral with the shaft 15, this portion may be made separate from the shaft 15 and be suitably secured thereto. The portion 24 is provided with an axial chamber 25 within which is located a suitable bearing shell 26.

A short shaft 27 has its outer end extending into and supported by the bearing member 26 to permit of relative rotation of the two members. The bearing 26 is made relatively long in order to provide ample bearing surface for the shaft, as well as to ensure that the axial alinement of the shaft 15, the portion 24, and the shaft 27 shall continue during the life of the device. At its other end the shaft 27 extends into and fits tightly within a chamber 28 formed in a driven shaft member 29 which is rotatably supported by the bearing member 23. The shaft 27 extends a relatively long distance into the member 29 in order to ensure the continuance of the axial alinement of the two members, and to obtain a relatively stiff and non-bending built-up member. A coupling member 31 may be suitably secured to the outer end of the member 29 and be connected to a driven shaft located in the torque tube 32, a universal coupling being located in a coupling housing 33 in a manner well known in the art.

An exteriorly-splined hollow shaft 34 is rotatably mounted on the short shaft which, as indicated particularly in Figs. 1 and 2 of the drawing, has its intermediate portion of relatively smaller diameter than its end portions. If desired, bronze bushings 35 may be provided on the inside of the hollow shaft 34 at each end thereof, to operate as bearings at the times when the hollow shaft 34 rotates on the short shaft 27. The usual change-speed gears 36 and 37 are located on the hollow shaft, and have splined internal surfaces as is well known in the art to permit the gear wheels to have longitudinal movement on the supporting shaft but to rotate therewith. The usual mechanism for changing the gears is provided, only a portion of which is illustrated in the drawings, comprising forked members 38 and 39 operated by the usual gear shift lever (not shown). As the details of this part of the device form no part of my invention, and as it is a standard part of the usual gear shift mechanism it is not believed necessary to illustrate or to describe the same in detail.

The inner end of the driven member 29 is provided with an integral laterally extending flange portion 41, which constitutes a multiple-jaw clutch member of the particular type described and claimed in my above mentioned patent. In general, the flange 41 is provided with a plurality of longitudinally extending jaw clutch members, the axial surface of each of which is inclined in a circumferential direction as described in the patent above referred to and illustrated in Fig. 3 of the drawing. A co-operating multiple-jaw clutch member 42 is slidably mounted on the splined hollow shaft whereby it is caused to rotate therewith but may be moved longitudinally thereon. The member 42 is provided with a plurality of co-operating jaw portions permitting it to operatively engage the member 41 to drive the same.

The member 42 is moved longitudinally on the hollow shaft by a link member 43 having a lost motion connection with and actuated by the foot pedal. A turnbuckle 44 may be provided in the link 43 to permit of adjusting the length, these two features being also described and claimed in the above numbered patent. A short shaft 45, operatively connected to the link 43 is longitudinally movable in supporting lugs 46 depending from the upper portion of the casing. The upper end of a forked shifting lever 47 is secured to the member 45 while the lower end fits into a groove in the member 42, and a spring 48 is located between the member 47 and the lug 46 to resiliently force the clutch member 42 into operative engagement with the rear clutch member 41.

An accelerator pedal 49 is connected in the usual manner to the throttle lever 51 controlling the operation of the engine. It is not believed necessary to illustrate this feature in detail as it forms no part of my invention and any construction desired may be employed. A rearwardly extending link member 52 is connected to the lower end of the accelerator pedal 49 and has its rear end pivotally connected to a bell crank lever 53 which is pivotally mounted on a suitable portion of the casing 16. The forked end of the horizontal portion of the lever 53 loosely engages a vertically extending locking member 54, the upper end of which is so formed as to be supported by the end of the horizontal portion of the lever 53. The lower end of the member 54 is provided with a beveled rear surface and a sharp front edge to operatively engage a notch 55 in the upper end of the forked member 47. A spring 56 is located on the intermediate portion of the member 54 in such position as to resiliently force the member 54 downwardly against the member 47.

The operation of the device is substantially as follows: under ordinary conditions of operation, as when changing from low to intermediate or from intermediate to high, the operator need only move the foot pedal lever 17 forward a relatively small amount to cause the two portions of the main clutch to be disengaged, after which the gears can be shifted in the usual manner. When it is desired however, to change from high to intermediate, or from intermediate to low, the operator presses the foot pedal lever 17 forward as far as possible, thus causing not only the main clutch to be disengaged or to open, but also the auxiliary clutch comprising the members 41 and 42 to be disengaged from each other. This results in disconnecting the hollow shaft 34 carrying the change-speed gears 36 and 37 not only from the driving engine, but also from the driven portion comprising the rear wheels and the other parts of the vehicle operatively connected thereto. The mass of the shaft 34 and of the gear wheels 36 and 37 is relatively small, and it is therefore possible to easily and quickly cause the proper gears to mesh, either to give the intermediate or the low speed as may be desired. When the operator moves the lever 17 forward to its fullest extent the member 42 is disengaged from the member 41 and the member 47 occupies substantially the position indicated in Fig. 3 of the drawing, the lower end of the locking member 54 being located in the notch 55, and for the time being, preventing the rearward movement of the member 47 and of the member 42 controlled thereby caused by the spring 48. As more particularly described in my above mentioned patent in order to permit the re-engagement of the two members 41 and 42, it is necessary to momentarily cause the speed of the member 42 to increase above that of the member 41. This action requires the movement of the accelerator pedal 49 by the operator, and this movement raises the member 54, causing its lower end to move out of the notch 55 and permitting the spring 48 to resiliently press the multiple-jaw clutch member 42 into operative engagement with the member 41. If the speed of the member 42 is made momentarily greater than that of the member 41 the relatively light spring 48 causes the two jaw clutch members to again operatively engage each other. If it is desired to coast down a long and steep hill, the above described operations permit of easily and safely changing from high to intermediate or even to low gear and provide a relatively strong braking action which may be still further increased by interrupting the ignition circuit.

The device embodying my invention thus provides a built up structure, comprising a driven shaft portion, a supporting shaft, and a splined hollow shaft located thereon, the driven shaft and the short supporting shaft being so secured together as to provide a relatively stiff structure for a transmission mechanism for motor vehicles. By providing a relatively long bearing for the outer end of the short shaft in the inner end of the driving shaft, I obtain relatively great rigidity, the result being that the driving shaft and the driven shaft are maintained in substantially axial alinement under all conditions of operation.

By interlocking the means for returning the movable jaw clutch member to its normal operative position, with the means for controlling the motor, I prevent any engagement of the opposing beveled clutch jaw surfaces until such time as the operator is ready to permit of their re-engagement and takes the necessary steps to ensure the same by operating the foot accelerator pedal to cause the engine to momentarily increase its speed.

While I have shown a specific embodiment of my invention, various changes may be made therein without departing from the spirit and scope of my invention, and I desire that only such limitations shall be placed thereon as are imposed by the prior art or are specifically set forth in the appended claims.

I claim as my invention:

1. In a transmission mechanism, in combination, a driving member, a power transmitting and gear-wheel-supporting member comprising a short shaft having its outer end rotatably supported in said driving member, a driven portion in axial alinement with said short shaft and a jaw-clutch member intermediate said power transmitting member, an exteriorly splined hollow shaft rotatably mounted on said short shaft, change-speed gear wheels on said splined hollow shaft operatively and selectively associated with said driving member, a jaw-clutch member located on said splined hollow shaft and manually operable means for causing said last named jaw-clutch member to engage or be disengaged from said first named jaw-clutch member.

2. In a motor vehicle, in combination, a motor, a driven member, change-speed gearing operatively connecting said motor and said driven member, a main clutch for disconnecting said change-speed gearing from said motor, a driving shaft having one end operatively connected to said main clutch, a power-transmitting and gear-wheel-supporting member comprising a short shaft having its outer end rotatably supported in the end of said driving shaft, a driven portion axially alined with said short shaft, a jaw-clutch member on said driven portion, and an exteriorly-splined hollow shaft rotatably mounted on said short shaft and having the change-speed gear wheels mounted thereon, a jaw-clutch member on said hollow shaft, and manually operable means for selectively actuating said main clutch and said last named jaw-clutch member.

3. In a transmission mechanism, in combination, a casing, a driving member projecting into said casing and rotatably supported thereby, a driven member rotatably supported by and projecting into said casing in axial alinement with said driving member and having a jaw-clutch portion integral therewith and located inside of said casing, a short shaft having one end extending into and rotatably supported by said driving member, and having its other end projecting into and fitting tightly in said driven member, an exteriorly-splined hollow shaft rotatably mounted on said short shaft, change-speed gear wheels on said hollow shaft, a second jaw-clutch portion mounted on said hollow shaft, and means for causing said second jaw-clutch portion to operatively engage or be disengaged from said first named jaw-clutch portion.

4. In a transmission mechanism, in combination, a driving member, a power transmitting and gear-wheel-supporting member comprising a short shaft having its outer end rotatably supported in said driving member, a driven portion in axial alinement with said short shaft and a jaw-clutch member intermediate said power transmitting member, an exteriorly-splined hollow shaft rotatably mounted on said short shaft, change-speed gear wheels on said splined hollow shaft operatively and selectively associated with said driving member, a jaw-clutch member located on said splined hollow shaft, manually operable means for causing said last named jaw-clutch member to engage or be disengaged from said first named jaw-clutch member, and means for preventing the engagement of said jaw-clutch members under predetermined conditions of operation of said driving member.

5. In a motor vehicle, in combination, a motor, a driven member, change-speed gearing operatively connecting said motor and said driven member, a main clutch for disconnecting said change-speed gearing from said motor, a driving shaft having one end operatively connected to said main clutch, a power transmitting and gear-wheel-supporting member comprising a short shaft having its outer end rotatably supported in the end of said driving shaft, a driven portion axially alined with said short shaft, a jaw-clutch member on said driven portion, and an exteriorly-splined hollow shaft rotatably mounted on said short shaft and having the change-speed gear wheels mounted thereon, a jaw-clutch member on said hollow shaft, manually operable means for actuating said main clutch and for causing said last named jaw-clutch member to engage or be disengaged from said first named jaw-clutch member, and means for permitting the reengagement of said jaw-clutch portions only under predetermined conditions of operation of said motor.

6. In a motor vehicle, in combination, a motor, means for controlling the operation of said motor, a driven member, change-speed gears operatively connecting said motor and said driven member, a main clutch connecting said motor and said change-speed gears, an auxiliary multiple-jaw clutch connecting said change-speed gears and said driven member, manually operable means for actuating said main clutch and said auxiliary clutch to their open and their closed positions and means interlocked with said motor controlling means for controlling the reclosing of said auxiliary clutch.

7. In a motor vehicle, in combination, a motor, means for controlling the operation of said motor, a driven member, change-speed gears operatively connecting said motor and said driven member, a main clutch connecting said motor and said change-speed gears, an auxiliary multiple-jaw clutch connecting said change-speed gears and said driven member, manually operable means for actuating said main clutch and said auxiliary clutch to their open and their closed positions and means interlocked with said motor controlling means for permitting the reclosing of said auxiliary clutch only under predetermined conditions of operation of said motor.

8. In a motor-vehicle, in combination, a motor, means for controlling the operation of said motor, a driven member, change-speed gears operatively connecting said motor and said driven member, a main clutch connecting said motor and said change-speed gears, an auxiliary multiple-jaw clutch connecting said change-speed gears and said driven member, manually operable means for actuating said main clutch and said auxiliary clutch to their open and their closed positions and means interlocked with said motor controlling means for permitting the opening of said main and said auxiliary clutch under all conditions of operation of said motor and for permitting the reclosing of said auxiliary clutch only in accordance with the position of said motor controlling means.

9. In a motor vehicle, in combination, a motor, means for controlling the operation of said motor, a driven member, change-speed gearing operatively connecting said motor and said driven member, a main clutch for disconnecting said change-speed gearing from said motor, a driving shaft having one end operatively connected to said main clutch, a power-transmitting and gear-wheel-supporting member comprising a short shaft having its outer end rotatably supported in the end of said driving shaft, a driven portion axially alined with said short shaft, a jaw-clutch member on said driven portion, and an exteriorly-splined hollow shaft rotatably mounted on said short shaft, and having the change-speed gear wheels mounted thereon, a jaw-clutch member on said hollow shaft, manually operable means for actuating said main clutch and for causing said last named jaw-clutch member to engage or be disengaged from said first named jaw-clutch member, and means interlocked with said motor controlling means for permitting the reclosing of said auxiliary clutch only under predetermined conditions of operation of said motor.

10. In a motor vehicle, in combination, a motor, means for controlling the operation of said motor, a driven member, change-speed gearing operatively connecting said motor and said driven member, a main clutch for disconnecting said change-speed gearing from said motor, a driving shaft having one end operatively connected to said main clutch, a power-transmitting and gear-wheel-supporting member comprising a short shaft having its outer end rotatably supported in the end of said driving shaft, a driven portion axially alined with said short shaft, a jaw-clutch member on said driven portion, and an exteriorly-splined hollow shaft rotatably mounted on said short shaft, and having the change-speed gear wheels mounted thereon, a jaw-clutch member on said hollow shaft, manually operable means for actuating said main clutch and for causing said last named jaw-clutch member to engage or be disengaged from said first named jaw-clutch member, and means interlocked with said motor controlling means for permitting the opening of said main and said auxiliary clutch under all conditions of operation of said motor and for permitting the reclosing of said auxiliary clutch only in accordance with the position of said motor controlling means.

In testimony whereof, I have hereunto subscribed my name this 29th day of May, 1922.

JOHN A. STUMPENHORST.